July 26, 1938.  W. TURNWALD  2,125,137

VALVE

Filed Nov. 27, 1936  2 Sheets-Sheet 1

INVENTOR
Wolfgang Turnwald.
BY Eugene H. Simpson
ATTORNEY

Patented July 26, 1938

2,125,137

UNITED STATES PATENT OFFICE 2,125,137

VALVE

Wolfgang Turnwald, Milwaukee, Wis., assignor to Nordberg Manufacturing Company, Milwaukee, Wis., a corporation of Wisconsin Application November 27, 1936, Serial No. 112,931

5 Claims. (Cl. 251—129)

This invention relates to valves and more particularly to a valve adapted to control the flow of gas containing viscous impurities, and is an improvement on the co-pending application of Rudolf Wintzer, Serial No. 77,838, filed May 4, 1936.

In pumping gas such as carbon dioxide gas, and particularly prior to the final purification of the gas, considerable trouble has been experienced because the valves stick and seat improperly.

One object of the present invention is to produce a valve adapted to high speed operation which will be more positive in its seating action than those now in use.

Another object is to produce a valve having a relatively large discharge opening in which the valve closure rotates during the seating to dislodge any dirt that may be between the seat and the valve closure member.

A further object is to produce a valve in which the gas imparts an initial impetus to rotate the valve closure member relative to the seat.

Another object is to reduce wear on the valve closure member.

A further object of the invention is to maintain clean the surface of the valve closure member which abuts the seat.

Other objects will be apparent upon considering the following specification, which, taken in connection with the accompanying drawings illustrate a preferred form of the invention.

Figure 1:
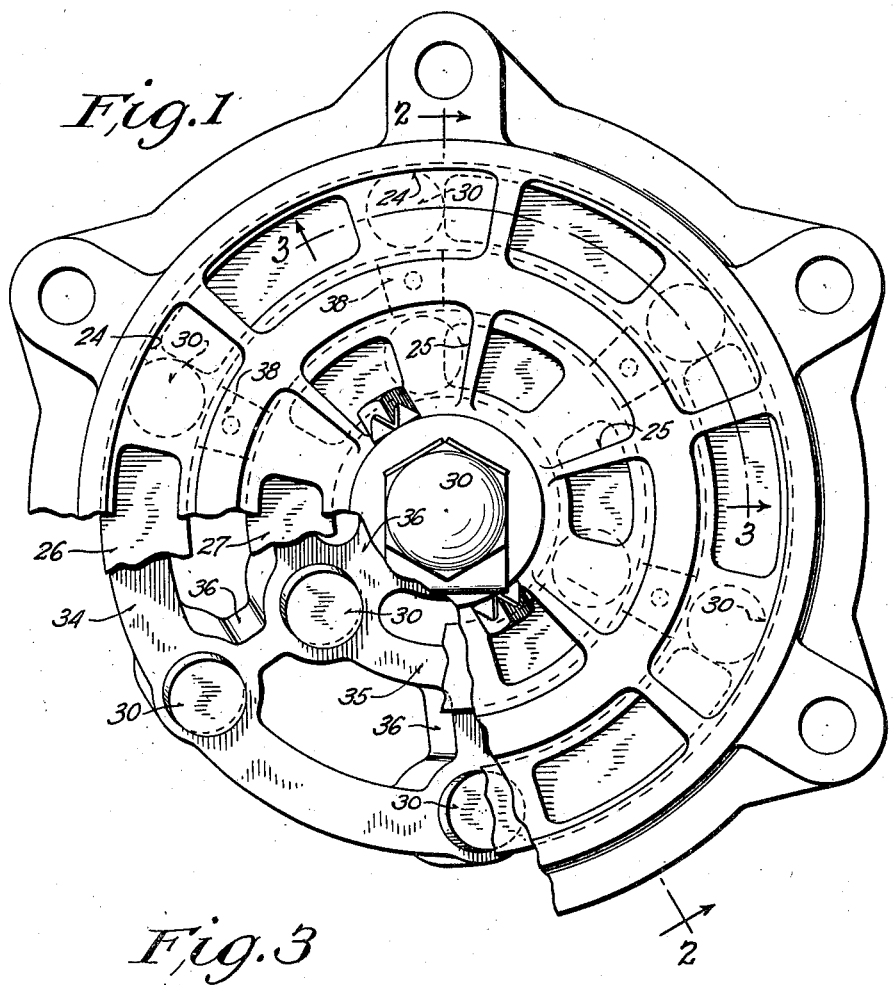
Fig. 1 is a plan view of a valve structure embodying the invention, certain parts thereof being broken away to more clearly illustrate other parts.
Figure 3:
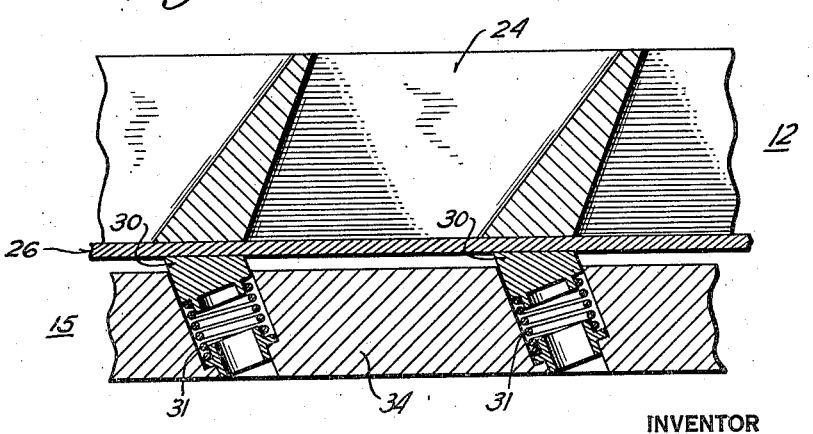
Fig. 3 is a developed section taken on the curved line 3—3 of Fig. 1 looking in the direction of the arrows.
Figure 2:
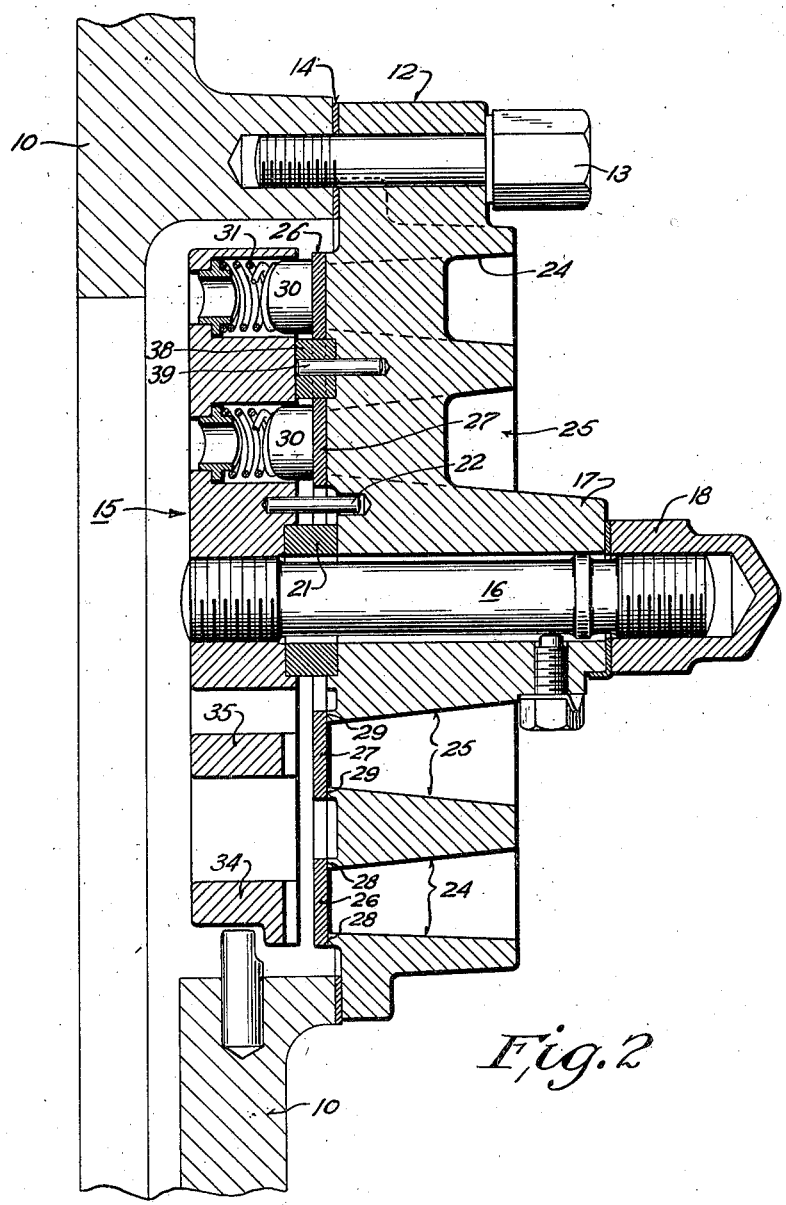
Fig. 2 is a cross-section on the line 2—2 of Fig. 1, looking in the direction of the arrows.

Referring to the drawings, in which like parts are indicated by like numerals throughout the several views, the valve is shown as attached to a flange 10 which may be mounted on a tank, pipe line or other device on the high pressure side of the pump (not shown).

A valve seat member or seat casting 12 is fastened to the flange 10 by stud bolts 13, with a suitable gasket 14 therebetween to insure a gas tight joint.

A valve guard 15 is held in engagement with the seat casting 12 by a stud bolt 16 which passes through a boss 17 and has a cap nut 18 seating on the top of the boss 17. The valve guard 15 is held spaced from the valve seat casting 12 by a distance washer 21 and is held in proper angular position by a pin 22.

The valve seat casting 12 has nozzle-like openings 24 and 25 passing through the casting from the outer to the inner face to admit and guide the gases through the valve. The inner ends of the opening 24 and 25 are normally maintained closed by ring valves or discs 26 and 27 which close against seats 28 and 29, respectively, surrounding the inner ends of the openings 24 and 25. The operation of the valves will be more fully described below.

The openings 24 and 25 are tapered inwardly to form nozzles which increases the velocity of the gas as it passes through the valve.

The axes of the nozzle openings 24 and 25 are all inclined from the vertical and in the same direction, so that as the gas passes through the nozzle openings and increases in velocity, it develops either a clockwise or a counter-clockwise thrust on the valve discs 26 and 27, which tends to rotate the valve discs. This twisting or rotating of the valve discs is augmented by the viscous impurities carried by the gas. The constant rotation in one direction of the valve discs due to the thrust of the entering fluid brings a different part of the valve discs 26 and 27 into engagement with the seats 28 and 29, respectively, each time the valve operates. This rotation cleans the surface of the valve discs adjacent the seat and prevents excessive wear of the valve discs.

The valve rings or discs 26 and 27 are normally held in engagement with the seats 28 and 29, respectively, by spring pressed plungers 30. The plungers 30 are urged into engagement with the valve discs by springs 31 which, with the plungers 30 are set on an angle to the normal so as to urge the discs 26 and 27 to rotate during the closing thereof in the same direction as the inclined nozzles.

The combined effects of the inclined nozzles 24 and 25 and the spring pressed plungers 30 is an initial twist on the valve due to the inclined air stream, which causes the discs 26 and 27 to slip on the plungers 30, and a further twist of the discs 26 and 27 in the same direction due to the inclined plungers, as the valve seats.

The valve guard 15 has circumferential ribs 34 and 35, which limit the movement of the valve discs 26 and 27, and radial ribs 36 supporting the ribs 34 and 35. The intersection of the ribs 34 and 35 with the ribs 36 form seats for the spring pressed plungers 30.

The valve discs 26 and 27 are maintained in proper position by guide blocks 38 which fit between the edges of the two valves and maintain the valve discs in their proper radial position. The blocks 38 also cooperate with the distance washer 21 in maintaining the valve guard 15 spaced from the valve seat casting 12. The guide blocks 38 are substantially trapezoidal in plan as seen in Fig. 1 and are fastened to the seat casting by pins 39.

It is obvious that this valve is adaptable to various uses and can be used equally well on either the intake or the exhaust side of a compressor. The valve is also susceptible to various changes and modifications and it is not therefore desired to limit the invention to the precise form herein shown and described but only by the scope of the appended claims.

What is claimed as new and desired to secure by Letters Patent is:

1. In a valve of the character described, a valve seating member including a valve seat, said member having nozzle-shaped openings therethrough, the axes of which are inclined from the vertical to direct fluid through the openings with a tangential component in one direction, a valve closure member covering said openings and seating on said seat and adapted to turn under the influence of the tangential component, and means to normally hold said valve closure against said seat.

2. In a valve of the character described, a valve seating member including a valve seat, said member having fluid openings therethrough, a valve closure member adapted to seat on said valve seat to close said openings, a valve guard beneath said valve closure member, said guard having inclined apertures therein, and spring pressed members seating in said apertures and urging said valve closure member into closed position with a rotary movement.

3. In a valve of the character described, a valve seating member including a valve seat, said member having fluid openings therethrough, the axes of which are inclined from the vertical, a valve closure member adapted to seat on said seat to close said openings, a valve guard beneath said valve closure member, said guard having inclined apertures therein, and spring pressed members seating in said apertures and urging said valve closure member into closed position with a rotary movement.

4. In a valve of the character described, a valve seat, a closure member seated on said seat, means constantly urging said closure member onto said seat, means to effect an initial rotation of said valve closure member in one direction relative to said seat and to said last named means, and separate means to effect rotary movement of the closure member in the same direction relative to the seat as the valve closes.

5. In a valve of the character described, a valve seat, a valve closure member adapted to seat on said seat and rotate relative thereto, a plurality of inclined nozzles discharging fluid onto said closure member to simultaneously open the valve closure member and rotate the same, and resilient means adapted to close the valve closure member and simultaneously rotate the same.

WOLFGANG TURNWALD.